N. F. GREEN.
CARBURETER.
APPLICATION FILED AUG. 26, 1913.
1,200,486.
Patented Oct. 10, 1916.
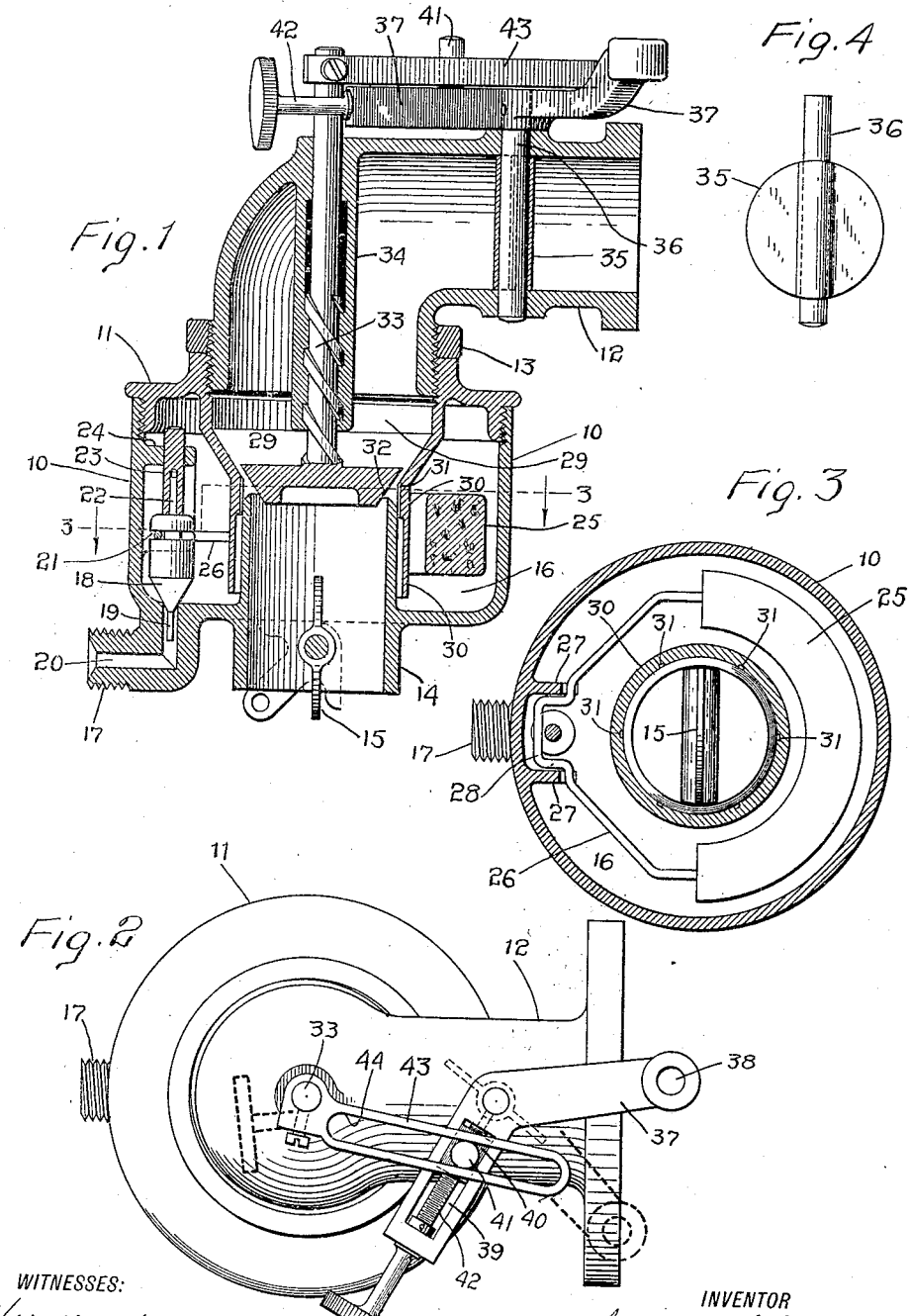

UNITED STATES PATENT OFFICE.

NATHAN F. GREEN, OF EAST HAVEN, CONNECTICUT, ASSIGNOR TO GREEN'S PATTERN SHOP, INCORPORATED, OF NEW HAVEN, CONNECTICUT, A CORPORATION OF CONNECTICUT.

CARBURETER.

1,200,486.  Specification of Letters Patent.  Patented Oct. 10, 1916.

Application filed August 26, 1913. Serial No. 786,765.

*To all whom it may concern:*

Be it known that I, NATHAN F. GREEN, a citizen of the United States, residing at East Haven, county of New Haven, State of Connecticut, have invented an Improvement in Carbureters, of which the following is a specification.

This invention has for its object to provide a simple, inexpensive and fool-proof carbureter in which the danger of clogging shall be practically eliminated, which may be easily and quickly cleaned, which may be connected up at any angle without the use of offsets, elbows or other connecting parts and in which the air control shall be mechanical instead of automatic, thereby doing away with one of the most serious causes of trouble with carbureters as ordinarily constructed.

With these and other objects in view I have devised the novel structure which I will now describe, referring to the accompanying drawing forming a part of this specification and using reference characters to indicate the several parts:

Figure 1 is a central vertical section of my novel carbureter, certain of the parts being in elevation; Fig. 2 a plan view corresponding therewith; Fig. 3 a section on the line 3—3 in Fig. 1; looking in the direction of the arrows; and Fig. 4 is an elevation of the throttle valve detached.

10 denotes the casing which is provided with a cap 11 having threaded engagement therewith, and 12 the engine pipe which has threaded engagement with the cap and is locked in place at any required adjustment in the horizontal plane by a nut 13.

14 denotes the air pipe which is concentric with the casing and is formed integral therewith or rigidly secured thereto. Within this pipe is the usual priming valve, indicated by 15. Within the casing and surrounding the air pipe is a gasolene reservoir, indicated by 16. Gasolene, or other hydrocarbon, is admitted to the reservoir by means of a pipe (not shown) attached to a hub 17. At the upper end of the hub is a valve seat which is engaged by a conical valve 18 which I term the gasolene valve. This valve is provided with a guide rod 19 which centers the valve in gasolene port 20, with a groove 21 and with a shank 22 which engages a socket in a spindle 23 which slides freely in a guide 24 cast integral with the casing. This construction enables me to assemble and disassemble the parts readily and insures perfect centering of the valve, at all times. The flow of gasolene into the reservoir is automatically controlled by means of a float 25 in the reservoir from which a two-armed lever 26 extends, said arms having their fulcrums in lugs 27 cast upon the casing. At the forward end of the arms is a U-shaped connecting piece 28 which engages groove 21 in the gasolene valve. When the gasolene or other hydrocarbon in the reservoir reaches its normal level, the float will be raised and lever 26 will act to close the valve. When the gasolene falls below the normal level the float will fall and the lever will raise the valve and permit gasolene to enter the reservoir again. Above the air pipe is a carbureting chamber 29, the walls of which are shown as formed integral with the cap. The walls of the carbureting chamber converge downward and are extended to form a tube 30 which fits closely over the air pipe and is provided with a plurality of ducts 31 through which gasolene is drawn from the reservoir by means of the incoming air, and passes to the carbureting chamber.

32 denotes the mixture valve which seats upon the upper end of the air pipe and also upon the wall of the carbureting chamber. Valve 32 is provided with a stem 33 having a thread with a steep pitch which has engagement longitudinally with a post 34 within the engine pipe and shown as cast integral therewith.

35 denotes the throttle valve in the engine pipe and 36 the stem of said valve, to the upper end of which a lever 37 is attached. An operating rod (not shown) is attached to an eye 38 on the throttle valve lever. The other arm of said lever is provided with a slot 39 in which a block 40 is adapted to slide. The block is provided with a stud 41 and is engaged by a screw 42 which is held against longitudinal movement and rotation of which adjusts the block.

43 denotes a lever which is adjustably secured to the stem of the air valve and is provided with a slot 44 which receives stud 41 on the block carried by the throttle valve lever.

When the carbureter is installed, the mixture valve is adjusted relatively to the throttle valve so as to produce the best results.

After this, no adjustment of the mixture valve is required but the mixture valve is operated mechanically coincidently with the operation of the throttle valve.

This construction, it will be noted, permits the parts to be separated and cleaned with the least possible inconvenience and also permits the engine pipe to be adjusted to any required position, without the use of offsets or elbows, by simply loosening nut 13 placing the engine pipe in the required position and then tightening up the nut again, and by doing away with automatic control of the mixture valve and controlling said valve mechanically in coöperation with the throttle valve I am enabled to produce a carbureter that is thoroughly reliable under all conditions.

Having thus described my invention I claim:

In a carbureter, the combination with a reservoir, a cap thereover, and an air pipe extending inward from the bottom thereof, of an engine pipe secured in an opening provided therefor in the cap, a tube of greater diameter than the air pipe depending from the cap having walls converging toward and inclosing the air pipe provided with a plurality of ducts about the air pipe, a post depending from the interior of the engine pipe above the center of the air pipe and tube extending within the cap, a conical mixture valve carried upon a stem mounted for reciprocation within the post, said valve seating upon the converging walls of the tube and top of the air pipe, a throttle valve, and means for operating said valves coincidently.

In testimony whereof I affix my signature in presence of two witnesses.

NATHAN F. GREEN.

Witnesses:
GEO. H. SIMMONDS,
NORMAN S. FOSTER.

Copies of this patent may be obtained for five cents each, by addressing the "Commissioner of Patents, Washington, D. C."